(12) United States Patent
Ryan et al.

(10) Patent No.: US 9,352,266 B2
(45) Date of Patent: May 31, 2016

(54) REFORMING CONCENTRATED VOC FUEL STREAM INTO REFORMATE AND SUPPLYING REFORMATE TO ENERGY CONVERSION DEVICE

(75) Inventors: Patrick Ryan, Sterling Heights, MI (US); Jeffery White, Dearborn, MI (US); Mark Wherrett, Canton, MI (US)

(73) Assignee: DTE Energy, Detroit, MI (US)

( * ) Notice: Subject to any disclaimer, the term of this patent is extended or adjusted under 35 U.S.C. 154(b) by 581 days.

(21) Appl. No.: 13/094,574

(22) Filed: Apr. 26, 2011

(65) Prior Publication Data
US 2011/0200898 A1    Aug. 18, 2011

Related U.S. Application Data

(62) Division of application No. 10/543,425, filed as application No. PCT/US03/19416 on Jun. 20, 2003, now abandoned.

(51) Int. Cl.
     *C01B 3/36*      (2006.01)
     *B01D 53/02*      (2006.01)
     (Continued)

(52) U.S. Cl.
     CPC ............... *B01D 53/02* (2013.01); *B01D 53/06* (2013.01); *B01D 53/72* (2013.01); *C01B 3/34* (2013.01);
     (Continued)

(58) Field of Classification Search
CPC ................. B01D 2257/708; B01D 2258/0208; B01D 53/02; B01D 53/06; B01D 53/12; B01D 53/72; C01B 2203/0244; C01B 2203/0844; C01B 2203/1211; C01B 2203/1258; C01B 2203/142; C01B 2203/82; C01B 2203/84; C01B 3/34; Y02E 60/32
See application file for complete search history.

(56) References Cited

U.S. PATENT DOCUMENTS 3,760,029 A * 9/1973 McCoy ................. C07C 5/2791
                                                       208/250
3,785,955 A * 1/1974 Davis ..................... C10G 61/06
                                                        208/64

(Continued)

FOREIGN PATENT DOCUMENTS

EP      0920900      6/1999
EP      1205433      5/2002

(Continued)

OTHER PUBLICATIONS

Official Letter from the European Patent Office Regarding Application No. 03817572.5, Dated Jun. 2, 2009, 5 Pages.

(Continued)

*Primary Examiner* — Imran Akram
(74) *Attorney, Agent, or Firm* — Damian Porcari; Brooks Kushman P.C.

(57) ABSTRACT

A device and method for producing a reformate fuel from a hydrocarbon gas source. The invention enables the conversion of a dilute hydrocarbon gas into a more easily consumable reformate fuel. Gases having low concentrations of hydrocarbons are concentrated using a concentrator into a gaseous or liquid concentrated VOC fuel. The concentrated VOC fuel is then converted into a reformate using a reformer. The reformate is more easily consumed by an energy conversion device such as a combustion engine, fuel cell, sterling engine or similar device that converts chemical energy into kinetic or electrical energy. The reformer enables complex hydrocarbon fuels that are not normally suitable for use in an energy conversion device to be converted into a reformate. The reformate may be directly supplied into the energy conversion device.

26 Claims, 3 Drawing Sheets

(51) Int. Cl.
  *B01D 53/06* (2006.01)
  *B01D 53/72* (2006.01)
  *C01B 3/34* (2006.01)
  *B01D 53/12* (2006.01)

(52) U.S. Cl.
  CPC ........... *B01D 53/12* (2013.01); *B01D 2257/708* (2013.01); *B01D 2258/0208* (2013.01); *C01B 2203/0244* (2013.01); *C01B 2203/0844* (2013.01); *C01B 2203/1211* (2013.01); *C01B 2203/1258* (2013.01); *C01B 2203/142* (2013.01); *C01B 2203/82* (2013.01); *C01B 2203/84* (2013.01); *Y02E 60/324* (2013.01)

(56) References Cited

U.S. PATENT DOCUMENTS

| | | | |
|---|---|---|---|
| 4,687,498 A * | 8/1987 | Maclean et al. | 62/624 |
| 5,026,951 A * | 6/1991 | Schmidt | C07C 5/2791 585/738 |
| 5,096,470 A * | 3/1992 | Krishnamurthy | B01D 53/047 99/102 |
| 5,248,566 A | 9/1993 | Kumar et al. | |
| 5,387,322 A * | 2/1995 | Cialkowski | B01D 3/009 202/158 |
| 5,439,594 A | 8/1995 | Regan et al. | |
| 5,451,249 A * | 9/1995 | Spiegel et al. | 95/117 |
| 5,538,540 A | 7/1996 | Whitlock | |
| 5,592,811 A | 1/1997 | Dodge et al. | |
| 5,676,738 A | 10/1997 | Cioffi et al. | |
| 5,730,860 A * | 3/1998 | Irvine | 208/213 |
| 5,779,768 A | 7/1998 | Anand et al. | |
| 5,832,713 A | 11/1998 | Maese et al. | |
| 5,852,927 A * | 12/1998 | Cohn et al. | 60/780 |
| 5,904,750 A | 5/1999 | Cowles | |
| 5,928,409 A * | 7/1999 | Sirkar | 95/45 |
| 5,968,235 A | 10/1999 | Grime et al. | |
| 6,045,772 A | 4/2000 | Szydlowski et al. | |
| 6,090,312 A * | 7/2000 | Ziaka | C07C 29/1518 252/373 |
| 6,119,778 A * | 9/2000 | Seidle | E21B 43/006 166/263 |
| 6,235,262 B1 * | 5/2001 | Andersen | 423/650 |
| 6,322,757 B1 * | 11/2001 | Cohn | B01J 19/088 123/3 |
| 6,467,271 B2 | 10/2002 | Youn | |
| 6,472,578 B1 * | 10/2002 | Rice | B01D 3/141 585/804 |
| 6,477,905 B1 | 11/2002 | Mitra | |
| 6,653,005 B1 * | 11/2003 | Muradov | B01J 8/009 429/410 |
| 2002/0100277 A1 | 8/2002 | Youn | |
| 2002/0110503 A1 | 8/2002 | Gittleman et al. | |
| 2003/0047037 A1 * | 3/2003 | Sethna | B01D 53/047 75/505 |
| 2003/0064259 A1 | 4/2003 | Gittleman | |
| 2003/0075045 A1 * | 4/2003 | Cowles et al. | 95/148 |
| 2003/0100812 A1 * | 5/2003 | Choi | C10G 25/03 585/820 |
| 2003/0187299 A1 * | 10/2003 | Machhammer | C07C 5/333 562/547 |
| 2003/0202914 A1 * | 10/2003 | Ryan | 422/171 |
| 2004/0024279 A1 | 2/2004 | Mason | |
| 2004/0040304 A1 * | 3/2004 | Wolff et al. | 60/651 |
| 2004/0086637 A1 * | 5/2004 | Chung | C23C 26/00 427/180 |
| 2004/0102669 A1 * | 5/2004 | Van Egmond | 585/638 |

FOREIGN PATENT DOCUMENTS

| | | |
|---|---|---|
| GB | 2364257 | 1/2002 |
| JP | 60168514 | 9/1985 |
| JP | H04504225 | 7/1992 |
| JP | H06510220 | 11/1994 |
| JP | S6340702 | 2/1998 |
| JP | H10508797 | 9/1998 |
| JP | 20030010626 | 1/2003 |
| JP | 20030507290 | 2/2003 |
| JP | 20030080019 | 3/2003 |
| JP | 20030137503 | 5/2003 |
| JP | 20000093727 | 4/2004 |
| WO | 9530470 | 11/1995 |

OTHER PUBLICATIONS

Supplemental European Search Report for Application No. 03737195.2, Completed by the European Patent Office on Feb. 13, 2008, 3 Pages.
Supplemental European Search Report for Application No. 03817572.5, Completed by the European Patent Office on Feb. 11, 2009, 3 Pages.
International Search Report for PCT/US03/19418, Completed by the US Patent Office on Aug. 27, 2004, 1 Page.
International Search Report for PCT/US03/19416, Completed by the US Patent Office on Nov. 24, 2003, 6 Pages.
International Search Report for PCT/US03/19418, Completed by the US Patent Office on Aug. 27, 2004, 5 Pages.
Rodrigues, Allan B.J., Measurement fo Metallic & Pearlescent, AIC Interim Symposium on Instrumentation for Colour Measurement, Die Farbe No. 37, berlin, Sep. 4, 1990, pp. 1-13.

* cited by examiner

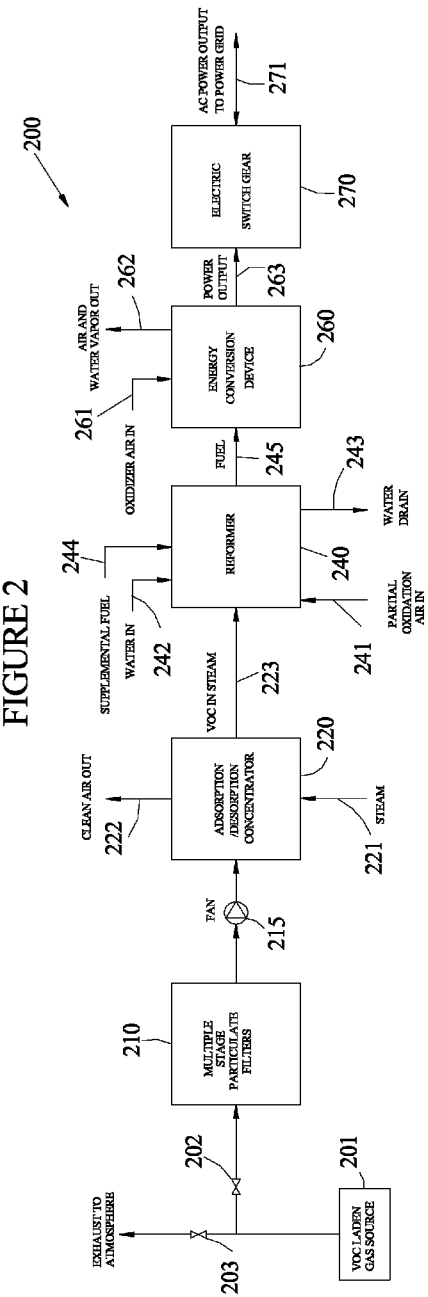

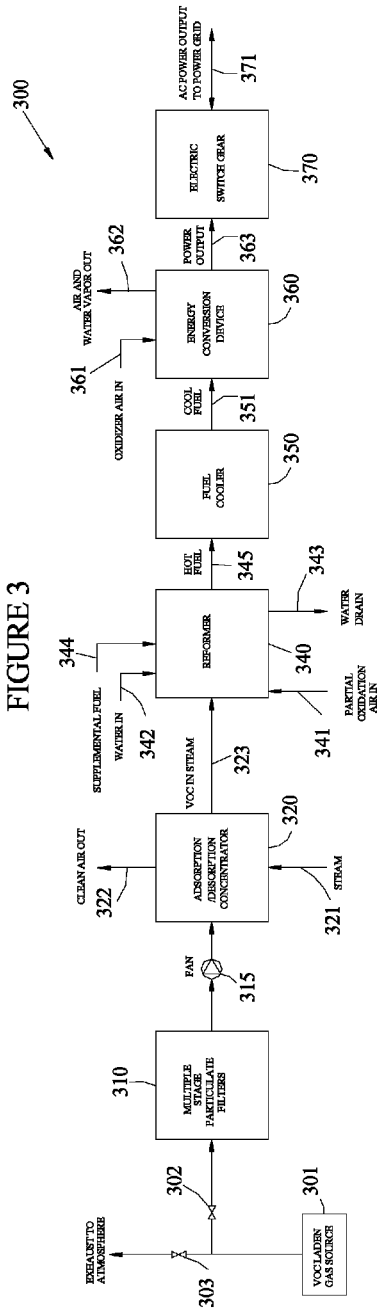

US 9,352,266 B2

REFORMING CONCENTRATED VOC FUEL STREAM INTO REFORMATE AND SUPPLYING REFORMATE TO ENERGY CONVERSION DEVICE

RELATED APPLICATIONS

This application is a divisional of application Ser. No. 10/543,425, filed May 10, 2006, which is the National Stage of International Application number PCT/US03/019416, filed Jun. 20, 2003, each of the entire contents of which is hereby incorporated by reference.

BACKGROUND

1. Field of the Invention

The present invention is directed to a method and device for converting Volatile Organic Compounds (VOC) into energy. More specifically, the invention relates to a method and device that concentrates a dilute hydrocarbon gas using a concentrator into a gaseous or liquid concentrated fuel. The concentrated fuel is then converted into a reformate using a reformer and converted into energy through an energy conversion device.

2. Background of the Invention

Various manufacturing, agricultural, contamination remediation and industrial processes produce a waste gas stream having dilute hydrocarbon concentrations. Some applications include those where the VOC is entrained in a solid or liquid media such as contaminated soil or water. The VOC can be converted to gas and separated from the solid or liquid media. Other processes produce or contain gaseous VOC. A number of processes exist to burn or oxidize the VOC, but the present invention is directed to recovering energy. If the concentration or purity of the VOC is sufficiently great and they are suitable to operate an Energy Conversion Device (ECD), they may be directly supplied to the ECD. In other cases, these dilute hydrocarbon concentrations are sometimes insufficient in their energy content to efficiently operate an ECD. ECDs include devices that convert chemical energy into electrical or kinetic energy such as combustion engines (internal or external), Stirling cycle engines, gas turbines, or fuel cells. In other situations, the waste gas stream has sufficient energy content to operate an ECD, but the form of the hydrocarbon is such that the ECD requires extensive modification to operate using the waste gas directly. For example, the waste gas may include complex hydrocarbons of varying concentrations or particulates. These gases may harm the ECD if they are not treated or converted to reformate.

Manufacturing processes that produce waste gas streams with a dilute hydrocarbon concentration are currently flared or burned or supplied to an ECD as part of the combustion air. Flaring the waste gas does not return any energy. Burning the waste gas produces heat. Recovering electrical or kinetic energy is generally much more valuable than recovered heat energy. GB patent application 2364257, published Jan. 1, 2002, and incorporated herein by reference, splits a gas stream having VOC into two streams. The first stream is directed to the combustion air intake of an engine and the second stream is directed to a combustion unit. Exhaust heat from the engine mixes with and combusts the second stream. This reference neither teaches concentrating the VOC nor directing the VOC to the fuel intake of the engine. WO9530470, published Nov. 16, 1995, and incorporated herein by reference, teaches a device to burn VOC in an engine by having two adsorption/desorption units so that the waste gas stream and engine may operate independently of one another. The first unit may collect and concentrate VOC as needed and the second unit supplies VOC to the engine as needed. This reference and the GB reference leave the VOC in the combustion air and do not feed the VOC to the fuel intake of the engine. US 2002/0100277 published Aug. 1, 2002, and incorporated herein by reference also teaches directing VOC to an internal combustion engine, but the VOC is not concentrated by a device. Their concentration is based on the vapor pressure of the VOC in the container. VOC not directed to the engine are condensed into a liquid by a chiller, but these liquefied VOC is not supplied to the engine as a fuel. None of these references teach reforming the concentrated VOC.

It is known that waste gases can be directly supplied to the combustion or exhaust air of an engine. One commercially available system supplies waste gases from an industrial operation to a turbine engine. In a paper by Neill and Gunter, VOC Destruction using Combustion Turbines, published September 2002, and incorporated herein by reference, describes a device that combines waste VOC with natural gas to operate a gas turbine. The gas turbine produces electricity for the facility. The waste gases come directly from the exhaust air of the industrial operation and are supplied to the engine as part of the combustion air. The turbine engine has a separate fuel source to supply the majority of the fuel. The exhaust air provides a relatively low (200 to 5000 ppm of unburned hydrocarbons and VOC) percentage of the energy content needed to operate the engine. Devices like this require an external fuel supply as part of the normal operation of the device. The external fuel supply is not merely a part of start-up or load leveling operation. These references teach directly supplying VOC to the engine without filtering or reforming and require an engine capable of consuming the VOC. By directing the VOC to the combustion air, a very large engine/generator is needed. The example given in Neill and Gunter is a 20 MW turbine to abate 150,000 Standard Cubic Feet per Minute (scfm) of air.

U.S. Pat. No. 5,451,249, issued Sep. 19, 1995, and incorporated herein by reference, teaches a device and method to supply a gas stream from a landfill to be used as the fuel source of a fuel cell. The natural gas component of the landfill gas is desirable and the VOC contained in the landfill gas is removed and is not used to supply fuel to the fuel cell. The U.S. Pat. No. 5,451,249 patent, describes heavy hydrocarbons as contaminant fractions that must be removed from the gas stream prior to reforming. Rather than teaching that the VOC is a contaminant, the present invention utilizes these hydrocarbons as the feedstock for the reformer.

The present invention is directed to a device and method to utilize the energy from waste VOC by converting the VOC into reformate for easier processing by the ECD. The present invention is capable of producing higher value kinetic or electrical energy from waste gases. The dilute VOC gas stream are organic compounds that evaporate readily into air may contain straight chain, branched, aromatic, or oxygenated hydrocarbons. The invention has the dual advantage of abating the hydrocarbons while producing electricity. More specifically, the dilute VOC presently considered waste products are reclaimed from the gas stream and used to generate electricity in a fuel cell, or via an internal or external combustion engine, a Stirling cycle engine, a gas turbine or another ECD that can produce electricity or kinetic energy. The invention is an energy efficient method to utilize the hydrocarbons entrained in the gas stream present in, or exhausted from, manufacturing, industrial, agricultural, environmental, or refinery processes.

SUMMARY OF THE INVENTION

The present invention provides for a device and method for producing a reformate. The device includes a concentrator that concentrates a dilute VOC gas stream. The concentrated VOC is then processed by a reformer into a reformate that is suitable to operate an ECD. The device is operated by adsorbing the dilute VOC onto an adsorbent media within a concentrator. The concentrator increases the concentration of VOC per unit volume. The adsorbed VOC is then desorbed to form a concentrated VOC fuel. The concentrated VOC fuel may be either liquefied VOC or a gaseous concentrated VOC fuel. The concentrated VOC fuel is then directed to a reformer to be converted into reformate. The procedure provides a process that efficiently utilizes the energy capacity within the dilute VOC gas stream.

Most industrial concentrators desorb with hot air. Because of the risk associated with allowing the concentration of hydrocarbons to approach the Lower Explosion Limit (about 1½% hydrocarbon by volume), the concentrations associated with gases in these devices never become sufficiently fuel rich for the desorbate to act as the primary fuel for an ECD. As described in the Background of the Invention, the dilute hydrocarbons are merely supplied to an engine as part of the combustion air. The engine requires a separate fuel supply to operate. Further, many waste gases are not suitable to be used as fuel in the ECD. By reforming these gases, they can be converted into a reformate which is more easily consumed by the ECD.

The device receives waste gas from a manufacturing or other process. If the gas is prone to contain particulates, it is filtered through a multiple stage filtration device prior to being concentrated. Then, the gas is directed into an adsorption chamber where the VOC is removed from the waste stream onto an adsorbent material. The adsorbent material is isolated from the VOC laden gas source and heated to release, or desorb, the VOC at regular intervals. The timing of the desorb cycle is such that the level of VOC saturation on the adsorbent material does not exceed a predetermined level. Heating the VOC laden adsorbent material causes the VOC to flash to high temperature vapor, which is then converted to reformate and directed to a fuel cell, engine or other type of ECD. A fuel cooler or condenser may be used to further process the fuel stream as necessary to prepare the fuel for introduction into the ECD. The water and $CO_2$ gases resulting from oxidation in the ECD are exhausted to the atmosphere. A control system is used to monitor and control the sequence.

A variety of ECDs may be utilized to convert the reformate into energy. Generators may be used to convert kinetic energy into electricity. In one embodiment, the dilute VOC laden gas stream passes through optional multiple stage particulate filters and an adsorption/desorption concentrator. VOC is stripped from the gas and adheres to the adsorbent media. The clean gas is vented to atmosphere or used elsewhere in the process, and inert gas passes over the adsorbent material to desorb the VOC. The inert gas-VOC mixture is routed to a condenser where it is cooled to condense the VOC. The inert gas is then recycled back to the desorption chamber. The cooled VOC, now condensed into a liquid, is directed to a reformer to convert the VOC to $H_2$ gas and oxides of carbon. The gaseous fuel is then directed to the ECD.

In an alternative embodiment, the VOC laden gas stream passes through optional multiple stage particulate filters and an adsorption/desorption concentrator. VOC is stripped from the gas and adhere to the adsorbent media. The clean gas is vented to atmosphere or used elsewhere in the process and a sweep gas passes over the adsorbent material to desorb the adhered VOC. The sweep gas may be gases that do not react with or oxidize the adsorbed VOC or the adsorption/desorption concentrator and include steam, inert gas, combustion products, or a fuel such as methane or another alkane. The concentrated sweep gas-VOC mixture then passes into a reformer to convert the hydrocarbons into $H_2$ gas and oxides of carbon. The reformate is directed to the ECD.

In another embodiment, the VOC laden gas stream passes through optional multiple stage particulate filters and an adsorption/desorption concentrator. VOC is stripped from the gas and adhere to the adsorbent media. The clean gas is vented to atmosphere or used elsewhere in the process and a sweep gas passes over the adsorbent material to desorb the adhered VOC. The concentrated sweep gas-VOC mixture then passes into a reformer to convert the hydrocarbons into $H_2$ gas and oxides of carbon. The reformate is then cooled in a fuel cooler. The cooled gaseous fuel is directed to the ECD.

BRIEF DESCRIPTION OF THE DRAWINGS

FIG. 2 illustrates an alternative device for removing dilute VOC from a gas stream and concentrating them into a high temperature gaseous fuel consisting of $H_2$, CO, and various inert gases such as $CO_2$, nitrogen, and water.

FIG. 3 illustrates a device for removing dilute VOC from a gas stream and concentrating them into a low temperature gaseous fuel consisting of $H_2$, CO, and various inert gases such as $CO_2$, nitrogen, and water.

DETAILED DESCRIPTION OF THE INVENTION

Figure 1:
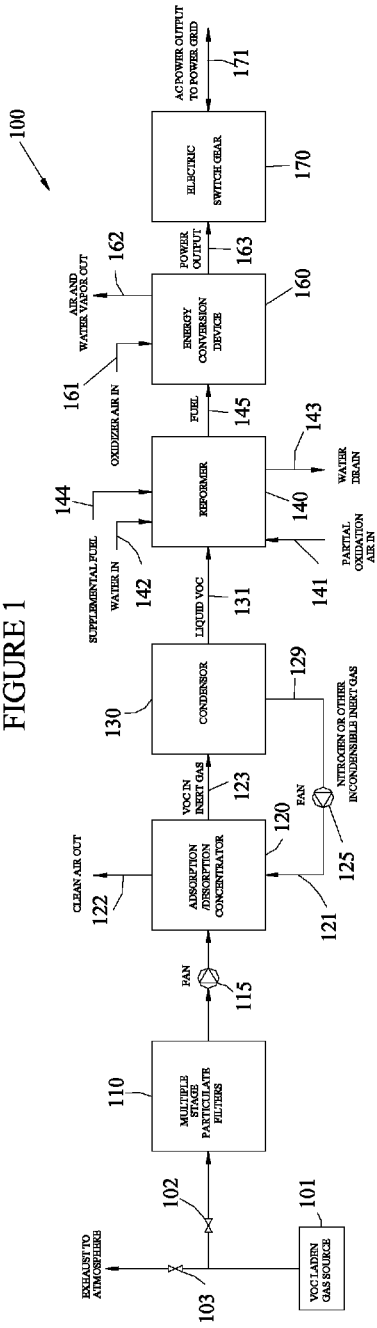
FIG. 1 illustrates a device for removing dilute VOC from a gas stream and concentrating them into a high temperature gaseous fuel consisting of $H_2$, CO, and various inert gases such as $CO_2$, nitrogen, and water.

The present invention is illustrated in a series of drawings where like elements have the same suffix, but the initial number matches the figure reference. A table of the various elements and reference numbers is reproduced below to aid in understanding the invention:

| ELEMENT | FIG. 1 | FIG. 2 | FIG. 3 |
|---|---|---|---|
| DEVICE | 100 | 200 | 300 |
| SOURCE | 101 | 201 | 301 |
| DAMPER | 102 | 202 | 302 |
| DAMPER | 103 | 203 | 303 |
| FILTERS | 110 | 210 | 310 |
| FAN | 115 | 215 | 315 |
| CONCENTRATOR | 120 | 220 | 320 |
| LINE | 121 | 221 | 321 |
| VENT | 122 | 222 | 322 |
| OUTLET | 123 | 223 | 323 |
| FAN | 125 | | |
| LINE | 129 | | |
| CONDENSER | 130 | | |
| LINE | 131 | | |
| REFORMER | 140 | 240 | 340 |
| LINE | 141 | 241 | 341 |
| INLET | 142 | 242 | 342 |
| LINE | 143 | 243 | 343 |
| INLET | 144 | 244 | 344 |
| LINE | 145 | 245 | 345 |
| FUEL COOLER | | | 350 |
| LINE | | | 351 |
| ECD | 160 | 260 | 360 |
| INLET | 161 | 261 | 361 |
| OUTLET | 162 | 262 | 362 |
| OUTPUT | 163 | 263 | 363 |
| SWITCHGEAR | 170 | 270 | 370 |
| CONNECTOR | 171 | 271 | 371 |

In each embodiment of the invention, VOC is reduced into hydrogen and oxides of carbon. The procedure provides a process that ultimately utilizes the hydrocarbons contained in the VOC to extract energy. The device reduces air emissions while using the multi-component solvents separated from the dilute VOC gas stream as fuel to produce electricity or kinetic energy.

In one embodiment, a dilute VOC gas stream from a manufacturing process is filtered through a multiple stage filtration system if particulate material is entrained within the gas stream. Then, the gas is directed into an adsorption chamber where the VOC is removed from the waste stream onto an adsorbent media. The adsorbent media is isolated from the VOC laden gas source and heated to release, or desorb, the VOC at regular intervals. The timing of the desorb cycle is such that the level of VOC saturation on the adsorbent media does not exceed a predetermined level. Heating the VOC laden adsorbent media causes the VOC to flash to high temperature vapor, which is then directed to a reformer, and then to an ECD that can be either an engine or fuel cell. Engines may be used to power equipment or to operate generators to produce electricity. In an alternative embodiment, a sweep gas passes over the adsorbent media to desorb the adhered VOC. The sweep gas may be steam, inert gas, combustion products, or another fuel such as methane or another alkane. The concentrated sweep gas-VOC mixture then passes into a reformer. In another embodiment, the reformate is cooled before introduction into the ECD. The water and $CO_2$ gases resulting from oxidation in the ECD are exhausted to the atmosphere. A control system is used to monitor and control the sequence.

FIG. 1 illustrates a first embodiment of a device 100 to remove VOC from the effluent gas stream of a manufacturing process and convert the VOC into a fuel that can be used to generate electricity. The VOC treatment begins at the VOC laden gas source 101, which allows VOC laden gas to pass through normally open damper 102 to the inlet of optional multiple stage particulate filters 110. The damper 102 directs the dilute VOC gas stream to be processed by the device 100. Normally closed bypass damper 103 allows temporary exhaustion to the atmosphere when the exhaust gas treatment device 100 is not operating. A booster fan 115 directs the filtered gas stream to the inlet of the adsorption/desorption concentrator 120. The dilute VOC gas stream enters an adsorption portion of the concentrator 120 where the VOC adheres to the adsorbent media as the gas passes through the concentrator 120. Exhaust vent 122 allows the process gas, now cleaned of VOC, to vent to the atmosphere or be redirected for use within the process or into another manufacturing process. The adsorbent media can be any commercially available adsorbent, such as activated carbon, zeolite, synthetic resin or mixtures thereof. The VOC laden adsorbent media, in a continuous loop, are directed to the desorption portion of the concentrator 120 where the entrained VOC is desorbed by heating the adsorbent media and passing an inert sweep gas, such as nitrogen, through the concentrator 120. The VOC is entrained in the sweep gas and proceeds out of the concentrator 120 via outlet 123 to a condenser 130. The condenser 130 cools the inert gas to a temperature, which is below the flash temperature of the VOC but above the condensation temperature of the inert gas, thereby separating the VOC (liquid) from the inert gas (gaseous) in the condenser 130. The inert gas is recycled through line 129 to fan 125 and through inlet line 121 into the desorption portion of the condenser 130. Nitrogen or another inert gas, with a condensing temperature significantly below the condensing temperature of the VOC, will be used to ensure adequate separation. The VOC, now in liquid form, exits the condenser through outlet line 131, and flow to reformer 140.

The reformer 140 breaks down the VOC into $H_2$, CO, $CO_2$, and water through a partial oxidation process such as Auto Thermal Reforming (ATR). Process water for the fuel processor enters through water inlet 142. Air is added through inlet line 141. Supplemental fuel, such as natural gas, is available through inlet line 144. Controls for the reformer 140 regulate the airflow in such a way as to maximize the production of $H_2$ and CO, and minimize the production of completely oxidized byproducts while maintaining thermal equilibrium. Water is condensed from the fuel stream after partial oxidation, and exits the fuel processor through drain line 143. The processed fuel, $H_2$ and CO, exits the fuel processor through line 145 to the inlet of the ECD 160, in this case, either a fuel cell or an engine. Additional air for oxidation within the ECD 160 is provided through inlet 161, which may be the redirected clean air from the vent 122. Air, $CO_2$, and water vapor exit the ECD 160 through outlet 162. The power output 163 connects to electrical switchgear 170. If the electrical power is produced by a fuel cell, the DC power is converted to AC power and stepped up to make it compatible with the facility's internal power grid. If the ECD 160 is a Stirling cycle engine, the AC power produced is stepped up via the switchgear. The connection to the facility's power grid, a protected bus that enables the device 100 to be self-supporting for emergency shutdown, is through connector 171.

While the device 100 is capable of operating on supplemental fuel, the amount of supplemental fuel added through valve 164 will be substantially below 90% and preferably near 0%. The device 100 is designed to operate completely on the energy content of the VOC fuel. Supplemental fuel is generally used in the initial device 100 start-up or when the output of the dilute VOC gas source falls below the efficient operation of device 100. Enabling the operation of device 100 exclusively on supplemental fuel provides redundant back-up power for the facility employing the device and is helpful in justifying the installation cost of the device.

The device may be scaled to accommodate large or small gas streams. In one application an automotive paint booth was ducted to device 100. The booth provided between 2000 and 6500 scfm of diluted VOC gas in air when it was fully operational. This dilute VOC gas stream was between 10 and 1000 ppm of aromatics such as xylene, straight chains such as heptane, and oxygenated hydrocarbons such as butyl acetate. At this concentration, the dilute VOC is below the Lower Explosion Limit of VOC in air.

Concentrator 120 increases the concentration of VOC to greater than 15,000 PPM and preferably to more then 200,000 PPM. Because the concentrated VOC is entrained in inert gas and not air, the risk of explosion is no greater than that of a pressurized fuel line. Other applications for the present invention include the capture of formaldehyde and acetic acid released during the manufacture of ethanol or the VOC emitted in baking VOC that are entrained in soil or water can be evolved into a dilute VOC gas stream that is then supplied to device 100 for processing. In another application, the device could be used to capture gasoline vapors vented from underground or above ground tanks, tanker trucks or ships or other vessels during filling or servicing. Many other applications that involve dilute VOC will be readily apparent to those skilled in the art and are contemplated by this invention.

FIG. 2 illustrates another embodiment of a device 200 to remove VOC from the effluent gas stream of a manufacturing process and convert the VOC into a fuel that can be used to generate electricity. The VOC treatment begins at the VOC laden gas source 201, which allows the VOC laden gas stream to pass through normally open damper 202 to the inlet of an optional multiple stage particulate filters 210. Normally closed bypass damper 203 allows temporary exhaustion to the atmosphere when the exhaust gas treatment device is not operating. A booster fan 215 directs the filtered gas stream to the inlet of the concentrator 220. The gas stream first enters an adsorption portion of concentrator 220 where the VOC adheres to the adsorbent media as the gas passes through the concentrator 220. The adsorbent media can be any commercially available adsorbent, such as activated carbon, zeolite, synthetic resin or mixtures thereof. The VOC laden adsorbent media, in a continuous loop, are directed to a desorption portion of concentrator 220 where 200-600° F. steam from an external steam generator or boiler device enters the concentrator 220 through inlet line 221 to heat the adsorbent media and vaporize the VOC to remove them (desorb) from the adsorbent media. Alternatively, a sweep gas composed of inert combustion products or a gaseous fuel such as methane or another alkane may be used as a carrier of the desorbed VOC. An additional heat source (not shown) may be required for the desorption portion of the concentrator 220. Exhaust vent 222 allows the process gas, now cleaned of VOC, to vent to the atmosphere or be redirected for use within the process or into another manufacturing process. The VOC, now in a gaseous form and entrained in a sweep gas, exit the concentrator 220 as a concentrated fuel via outlet 223 that directs it to a reformer 240.

The reformer 240 breaks down the VOC into $H_2$, CO, $CO_2$, and water through a partial oxidation process such as Auto Thermal Reforming (ATR). If necessary, additional process water for the fuel processor enters through water inlet 242. Air is added through inlet line 241. Supplemental fuel, such as natural gas, is available through inlet line 244. Controls for the reformer 240 regulate the airflow in such a way as to maximize the production of $H_2$ and CO, and minimize the production of completely oxidized byproducts while maintaining thermal equilibrium. Water is condensed from the fuel stream after partial oxidation, and exits the fuel processor through drain line 243. The processed fuel, $H_2$ and CO, exits the fuel processor through line 245 to the inlet of the ECD 260, in this case, either a fuel cell or an engine. Additional air for oxidation within the ECD is provided through inlet 261, which may be the redirected clean air from the vent 222. Excess air, $CO_2$, and water vapor exit the ECD through outlet 262. The power output 263 connects to electrical switchgear 270. If the electrical power is produced by a fuel cell, the DC power is converted to AC power and stepped up to make it compatible with the facility's internal power grid. If the ECD 260 is a Stirling cycle engine, the AC power produced is stepped up via the switchgear. The connection to the facility's power grid, a protected bus that enables the device 200 to be self-supporting for emergency shutdown, is through connector 271.

FIG. 3 illustrates another embodiment of a device 300 to remove VOC from the effluent gas stream of a manufacturing process and convert the VOC into a fuel that can be used to generate electricity. The VOC treatment begins at the VOC laden gas source 301, which allows the VOC laden gas stream to pass through normally open damper 302 to the inlet of an optional multiple stage particulate filters 310. Normally closed bypass damper 303 allows temporary exhaustion to the atmosphere when the exhaust gas treatment device is not operating. A booster fan 315 directs the filtered gas stream to the inlet of the adsorption/desorption concentrator 320. The gas stream first enters an adsorption portion of the concentrator 320 where the VOC adheres to the adsorbent media as the gas passes through the concentrator 320. The adsorbent media can be any commercially available adsorbent, such as activated carbon, zeolite, or synthetic resin. The VOC laden adsorbent media, in a continuous loop, are directed to the desorption portion of the concentrator 320 where 200-600° F. steam from an external steam generator or boiler system enters the concentrator 320 through inlet line 321 to heat the adsorbent media and vaporize the VOC to remove them (desorb) from the adsorbent media. Alternatively, a sweep gas composed of inert combustion products or a gaseous fuel such as methane or another alkane may be used as a carrier of the desorbed VOC. If natural gas is used, sulfur scrubbers may be needed to remove sulfur and other materials that may contaminate the adsorbent media. An additional heat source (not shown) may be required for the desorption portion of the concentrator 320. Exhaust vent 322 allows the process gas, now cleaned of VOC, to vent to the atmosphere or be redirected for use within the process or into another manufacturing process. The VOC, now in a gaseous form and entrained in the sweep gas, exit the adsorption/desorption concentrator 320 via outlet 323 and are directed to a reformer 340.

The reformer 340 breaks down the VOC into $H_2$, CO, $CO_2$, and water through a partial oxidation process such as Auto Thermal Reforming (ATR). If necessary, additional process water for the fuel processor enters through water inlet 342. Air is added through inlet line 341. Supplemental fuel, such as natural gas, is available through inlet line 344. Controls for the reformer 340 regulate the airflow in such a way as to maximize the production of $H_2$ and CO, and minimize the production of completely oxidized byproducts while maintaining thermal equilibrium. Water is condensed from the fuel stream after partial oxidation, and exits the fuel processor through drain line 343. The processed fuel, $H_2$ and CO, exits the fuel processor through line 345 to the inlet of a fuel cooler 350, where it is cooled to a useable temperature. The fuel exits the cooler via valve 351 and is directed to the inlet of the ECD 360, in this case, either a fuel cell or an engine. Additional air for oxidation within the ECD is provided through inlet 361, which may be the redirected clean air from the vent 322. Excess air, $CO_2$, and water vapor exit the ECD through outlet 362. The power output 363 connects to electrical switchgear 370. If the electrical power is produced by a fuel cell, the DC power is converted to AC power and stepped up to make it compatible with the facility's internal power grid. If the ECD 360 is an engine, the AC power produced is stepped up via the switchgear. The connection to the facility's power grid, a protected bus that enables the device 300 to be self-supporting for emergency shutdown, is through connector 371.

The above descriptions of the process identify certain preferred embodiments, which are not meant to be limiting in the application of the devices described.

Each embodiment references an optional multiple stage filtration system. This filter is intended to remove any organic and inorganic particulates that may contaminate the ECD or the reformer. Some VOC sources may not contain particulates, and some ECDs may have tolerance for some particulates, therefore, the filtration system may not be needed in some applications of the process.

The concentrator is described as a moving system in which the adsorbent material is transported from adsorption portions to desorption portions. It is recognized that this can be accomplished by a fluidized bed system or a system of adsorbent material attached to a rotating wheel. Also, the concentrator could be configured such that the adsorbent material is arranged in fixed beds and adsorption and desorption are variously alternated by controlling valves that direct the source gas flow and effluent fuel flow. The concentrator should be capable of desorbing VOC in a non-oxidizing environment, of separating the desorbed effluent from the clean gas leaving the adsorber, and be capable of concentrating the VOC such that the desorbed effluent has a hydrocarbon concentration above 15,000 PPM VOC. The sweep gases can be inert gases, steam, or fuel such as methane or another alkane, such that the sweep gas does not contain free oxygen, which could react in the desorption step with the hydrocarbons present in the device.

The ATR Reformer also may contain various alternatives. Auto Thermal reforming is made up of two process steps: partial oxidation and steam reforming. A simple steam reformer may be used for simple VOC fueling some ECDs, but more complex reforming, utilizing water-gas shift reactions and/or preferential oxidation, may be necessary for certain generators such as Proton Exchange Membrane fuel cells. Also, plasma arc decomposition may be suitable for some fuels.

It will be apparent that the device described in this invention is constructed from commercially available components, which when operated in the particular combinations described above, form a device that generates electricity from the waste gas stream of certain manufacturing processes. The embodiments described above result in a variety of fuel types to be used in fuel cells, engines, turbines, or other ECDs including: reformed hot gaseous fuel, and reformed cold gaseous fuel. The fuel desired will direct the choice of components in the device.

The embodiments of the invention and the types of fuel described above are not intended to limit the application of the invention. The components of the device can be recombined in other variations without departing from the concept of this invention. It is not intended to limit the application of the invention except as required by the following claims.

Various preferred embodiments of the invention have been described in fulfillment of the various objects of the invention. It should be recognized that these embodiments are merely illustrative of the principles of the invention. Numerous modifications and adaptations thereof will be readily apparent to those skilled in the art without departing from the spirit and scope of the present invention.

What is claimed is:

1. A method comprising:
   adsorbing NMVOC, from a gaseous VOC stream originating from a source thereof, onto an adsorbent media contained within an adsorbing chamber;
   directing the adsorbent media to a desorbing chamber;
   desorbing NMVOC from the adsorbent media in the desorbing chamber to form a concentrated NMVOC fuel (CNF);
   reforming the CNF into a reformate; and
   supplying the reformate to an energy conversion device.

2. The method of claim 1, wherein the desorbing includes heating the adsorbent media.

3. The method of claim 2, wherein the desorbing includes injecting sweep gas into the desorbing chamber.

4. The method of claim 3, wherein the sweep gas is steam.

5. The method of claim 3, wherein the sweep gas is inert.

6. The method of claim 5, further comprising condensing the CNF into a liquid.

7. The method of claim 5, wherein the sweep gas is nitrogen.

8. The method of claim 3, wherein the sweep gas is a gaseous fuel.

9. The method of claim 1, wherein the adsorbent media is in a continuous loop.

10. The method of claim 1 further comprising cooling the reformate.

11. The method of claim 1, wherein the reformate contains $H_2$ gas and oxides of carbon.

12. The method of claim 1 further comprising filtering the gaseous VOC stream.

13. The method of claim 1, wherein the gaseous VOC stream is selected from the group comprising straight chain hydrocarbons, branched hydrocarbons, aromatic hydrocarbons, oxygenated hydrocarbons and mixtures thereof.

14. The method of claim 1, wherein the gaseous VOC stream is between 1 ppm and 5000 ppm VOC.

15. The method of claim 1, wherein the gaseous VOC stream is paint exhaust.

16. The method of claim 1, wherein the gaseous VOC stream is gasoline vapor.

17. The method of claim 1, wherein the gaseous VOC stream is formaldehyde and acetic acid.

18. The method of claim 1 further comprising directing another fuel to the energy conversion device, whereby the energy conversion device consumes a fuel mixture of the reformate and another fuel.

19. The method of claim 18 further comprising controlling a proportion of the reformate and another fuel supplied to the energy conversion device.

20. The method of claim 19 further comprising varying an amount of the another fuel in response to an amount of the reformate.

21. The method of claim 18, wherein the another fuel is between 0 and 90% of the fuel mixture.

22. The method of claim 1, wherein the energy conversion device is a Stirling engine.

23. The method of claim 1, wherein the energy conversion device is a fuel cell.

24. The method of claim 1, wherein the energy conversion device is an internal combustion engine.

25. The method of claim 1, wherein the energy conversion device produces electricity.

26. The method of claim 25 further comprising supplying the electricity to a power grid.

* * * * *